United States Patent [19]
Hobes et al.

[11] Patent Number: 4,529,132
[45] Date of Patent: Jul. 16, 1985

[54] PROCESS FOR PREPARING FREE-FLOWING ETHYLENE HOMOPOLYMERS OR COPOLYMER WAXES

[75] Inventors: John Hobes, Dinslaken; Detlef Deymann, Essen, both of Fed. Rep. of Germany

[73] Assignee: Ruhrchemie Aktiengesellschaft, Oberhausen, Fed. Rep. of Germany

[21] Appl. No.: 427,093

[22] Filed: Sep. 29, 1982

[30] Foreign Application Priority Data

Mar. 4, 1982 [DE] Fed. Rep. of Germany ....... 3207744

[51] Int. Cl.³ ............................................. B02C 19/12
[52] U.S. Cl. ..................................... 241/1; 106/271; 241/16; 241/17; 241/21; 241/23

[58] Field of Search .................. 560/205, 261; 241/16, 241/17, 21, 23, 24, 30, 1; 366/348; 106/271; 525/255; 521/142; 524/587; 528/503; 264/9, 115, 117, 118

[56] References Cited

U.S. PATENT DOCUMENTS

| | | | |
|---|---|---|---|
| 2,595,831 | 5/1952 | Denie et al. | 241/23 |
| 2,598,666 | 6/1952 | Sesso et al. | 106/271 X |
| 3,532,782 | 10/1970 | Hartwimmer | 264/117 |
| 3,586,654 | 6/1971 | Lerman et al. | 264/117 X |

FOREIGN PATENT DOCUMENTS 7407833 12/1974 Netherlands .......................... 241/23

Primary Examiner—Mark Rosenbaum
Attorney, Agent, or Firm—Jordan B. Bierman

[57] ABSTRACT

The invention relates to the preparation of free-flowing homopolymer and copolymer waxes by heating the solid or molten waxes in aqueous ammonia solution.

14 Claims, No Drawings

PROCESS FOR PREPARING FREE-FLOWING ETHYLENE HOMOPOLYMERS OR COPOLYMER WAXES

This Application claims the priority of German Application P 32 07 744.0, filed Mar. 4, 1982.

The present invention relates to a process for preparing free-flowing ethylene homopolymer or copolymer waxes by heating the solid or molten waxes and stirring in aqueous ammonia solution.

Various methods are already known for converting waxes from the molten or solid state into pulverulent to granular products. This conversion can be effected by spraying or atomizing the melts; alternatively, it can be accomplished by pellet formation, flake formation, dissolution and subsequent precipitation, as well as by strip granulation of the solid waxes. The aforementioned procedures are technically very expensive and mitigate against the economic production of free-flowing material. A further problem is that fine-particled copolymer waxes tend to agglomerate.

It is an object of this invention to develop a process which enables both ethylene homopolymer and copolymer waxes to be converted into free-flowing, non-agglomerating particles in a simple manner. According to the invention, this objective is achieved by suspending the solid or molten waxes in an aqueous ammonia solution, heating this suspension while stirring at temperatures just below the melting point range of the waxes, and stirring the suspension further while heating.

According to the new procedure, a wide variety of ethylene homopolymer and copolymer waxes can be converted into fine-particle form. Starting materials with viscosities of between 100 and 10,000 mPas (measured at 140° C. in a rotation viscosimeter) are suitable. Polymers of ethylene with vinyl acetate, vinyl acetamide, acrylic acid and methacrylic acid, as well as esters and amides of acrylic acid and methacrylic acid may, for example, be used as copolymer waxes. The copolymer may contain one or more of the afore-mentioned monomers in addition to ethylene. Typical examples of such copolymer waxes are copolymers of ethylene and vinyl acetate; ethylene and vinylmethyl acetamide; ethylene and acrylic acid; and ethylene, acrylic acid and acrylic acid tert. butyl esters.

The waxes are suspended in the solid, conveniently comminuted state, or in the molten state, in an aqueous ammonia solution. In this connection, it is recommended that a volume ratio of molten wax to aqueous ammonia solution of 1:1 to 1:20, and in particular 1:2 to 1:5, be maintained. The concentration of the aqueous ammonia solution may be varied over wide ranges. Thus, 0.5% and also 25% solutions can be used. The treatment time is governed by the boiling point and thus the concentration of the ammonia solution. Relatively high concentration solutions which have a low boiling point (which rises in the course of heating on account of loss of ammonia), require a longer treatment time than low concentration solutions with a higher boiling point. Accordingly, the preparation time for the fine particled products varies between several hours and 5 to 15 minutes.

According to a special embodiment of the invention, 0.1 to 1% by weight of emulsifier (based on the solution) is added to the ammonia solution as a suspension aid. Suitable emulsifiers include the commercially available capillary-active compounds such as soaps, fatty alcohol sulfates, and alkyl and/or aryl sulfonates. They are normally used as individual substances, though they may also be used as mixtures.

The stirring speed is of considerable importance for the formation of the particle size, and depends on the type of wax, the reactor geometry, and stirrer paddle geometry, and must be individually adjusted from reactor to reactor. In general it is true that with reactors of equal dimensions, higher stirring speeds lead to smaller particles, and that larger reactors require a lower stirring speed than smaller reactors in order to obtain particles of the same size.

The new process is carried out in vessels equipped with stirring means. Comminuted or molten wax is added to the ammonia solution in the vessel. The suspension is then heated to temperatures which are about 2° to about 10° C. below the melting point range of the wax. The term "melting point range" is understood to mean that temperature range in which the wax is converted from the solid to the molten state. Normally, this range extends over several °C. Heating is carried out while stirring. When the desired temperature is reached, the suspension is stirred further until all the wax has been broken down into fine particles. The suspension is then cooled to room temperature while stirring. The end product is separated by filtration and is washed and dried.

The cooling procedure can be avoided by adding the hot suspension of ammonia solution and wax as quickly as possible to ice water while stirring; the reaction product is obtained in the form of small spheres. This variant is particularly recommended in the case of polymer waxes whose particles readily agglomerate. In order to reduce this agglomeration tendency still further, it is advisable to add 0.1 to 0.5% by weight of talcum (based on the ice water) to the ice water.

The new process is illustrated in the following Examples.

EXAMPLE 1

150 g of ethylene/vinyl acetate wax with a vinyl acetate content of 10.9% by weight (drop point: 95° C., viscosity 140° C.: 1200 mPas) and 850 g of 25% aqueous $NH_3$ solution are placed in a 2 liter, three-necked flask provided with a stirrer, reflux condenser, and contact thermometer.

The mixture is heated to 95° C. while stirring, and stirred for a further 15 minutes at this temperature, whereupon the wax melt breaks down into fine droplets. The suspension is cooled to 20° C. while stirring at a rate of 300 rpm, and a spherical particulate wax having a particle size of 0.5–4 mm is obtained after filtration and drying.

EXAMPLE 2

500 g of ethylene/vinyl acetate wax with a vinyl acetate content of 26.5% by weight (drop point: 85° C., viscosity 140° C.: 1660 mPas) and 2500 g of 2% aqueous $NH_3$ solution are placed in a 6 liter, three-necked flask provided with a stirrer, reflux condenser, and contact thermometer.

The mixture is heated to 60° C. while stirring, and stirred for a further 10 minutes at this temperature, whereupon the wax breaks down into fine droplets. The suspension is cooled to 20° C. while stirring at a rate of 150 rpm. The wax is obtained in the form of small spheres 3–4 mm in diameter after filtration, washing, and drying in a circulating air drying cabinet. 0.25% of talcum is added to the wash water in order to prevent agglomeration of the sticky wax bubbles.

EXAMPLE 3

150 g of ethylene/vinyl acetate wax with a vinyl acetate content of 10.9% by weight (drop point: 95° C., viscosity 140° C.: 1200 mPas), 850 g of 25% aqueous $NH_3$ solution, and 1.5 g of sodium lauroyl sulfate are placed in a 2 liter, three-necked flask provided with a stirrer, reflux condenser, and contact thermometer.

The mixture is heated to 95° C. while stirring, and stirred for a further 15 minutes at this temperature, whereupon the wax melt breaks down into fine droplets. The suspension is cooled while stirring at a rate of 800 rpm, and a lenticular wax having a particle size of 0.5–8 mm is obtained after filtration, washing with $H_2O$, and drying in a circulating air drying cabinet.

EXAMPLE 4

1200 g of ethylene/vinyl acetate wax with a vinyl acetate content of 15.3% by weight (drop point: 89° C., viscosity 140° C.: 1850 mPas), 6000 g of 25% aqueous $NH_3$ solution, and 1.2 g Na lauroyl sulfate are placed in a 10 liter capacity glass reactor provided with a paddle stirrer, thermometer, reflux condenser, and flow breaker.

The mixture is heated to 90° C. while stirring and, after reaching this temperature, the wax melt breaks down into droplet-like particles. The mixture is cooled to 20° C. while stirring at a rate of 150 rpm, and uniform spherical particles of diameter 1–2 mm are obtained after filtration, washing, and drying in a circulating air drying cabinet.

EXAMPLE 5

150 g of polyethylene wax (drop point: 106° C., viscosity 140° C.: 680 mPas) and 850 g of 25% aqueous $NH_3$ solution are placed in a 2 liter, three-necked flask provided with a stirrer, reflux condenser, and contact thermometer.

The mixture is heated to 95° C. while stirring. After stirring for 15 minutes at this temperature, the formation of fine wax particles is complete. The spherical reaction product is poured hot into iced water while stirring. After filtration and drying, uniform spherical particles of diameter 1–2 mm are obtained.

EXAMPLE 6

150 g of ethylene/vinylmethylacetamide copolymer wax with a vinylmethylacetamide content of 8.4% by weight (drop point: 92° C., viscosity 140° C.: 420 mPas) and 850 g of 10% aqueous $NH_3$ solution are placed in a 2 liter, three-necked flask provided with a stirrer, reflux condenser, and contact thermometer.

The mixture is heated to 60° C. while stirring. After 10 minutes the polymer melt breaks down into fine droplets. After cooling, filtration and drying, a uniform droplet-like product of particle diameter 1 mm is obtained.

EXAMPLE 7

150 g of ethylene/acrylic acid copolymer wax with an acrylic acid content of 4.7% by weight (drop point: 97° C., viscosity 140° C.: 1000 mPas) and 850 g of 25% aqueous $NH_3$ solution are placed in a 2 liter, three-necked flask provided with a stirrer, reflux condenser, and contact thermometer.

The mixture is stirred for 1 hour at 60° C. and for a further 2 hours at 95° C., following which the copolymer wax breaks down into a powder. After processing, a very fine material is obtained which, under the microscope, is found to have a spherical structure with a particle diameter of 10 to 40μ.

EXAMPLE 8

150 g of an ethylene/acrylic acid/acrylic acid tert.-butyl ester terpolymer wax with a content of 4.9% by weight acrylic acid and 5.6% by weight acrylic acid ester (drop point: 94° C., viscosity 140° C.: 730 mPas) and 850 g of 25% aqueous ammonia solution are placed in a 2 liter flask provided with a stirrer, reflux condenser, and contact thermometer.

The mixture is stirred for 1 hour at 50° C. and for a further 2 hours at 95° C., following which the terpolymer wax breaks down into a fine powder. Very fine, spherical particles of uniform particle diameter of about 50μ are obtained after processing.

EXAMPLE 9

150 g of ethylene/acrylic acid copolymer wax with a content of 31.5% by weight of acrylic acid (drop point: 83° C., viscosity 140° C.: 2750 mPas), 850 g of water, and 1.5 g of an alkane sulfonate are placed in a 2 liter, three-necked flask provided with a stirrer, reflux condenser, and contact thermometer.

The mixture is heated to 95° C. while stirring, following which the wax melt breaks down into small spheres after 10 minutes. The mixture is poured hot while stirring into ice water containing 0.25% by weight of talcum. After filtration and drying, uniform spherical particles of 2 mm diameter are obtained which, although being soft, do not have any tendency to agglomerate.

What we claim is:

1. A process for the preparation of a free-flowing, particulate ethylene wax having a melting pointing range, said wax being selected from the group consisting of ethylene homopolymer and copolymer waxes, comprising
   (a) suspending said wax in an aqueous ammonia solution,
   (b) then heating said wax in said solution to a temperature just below said melting point range while stirring, and
   (c) further stirring while continuing said heating, wherein said wax is in a solid state.

2. The process of claim 1 wherein said ammonia solution contains 0.1 to 1% by weight of emulsifier based on said solution.

3. The process of claim 1 wherein said temperature is about 2° to about 10° C. below said melting point range.

4. The process of claim 1 wherein said further stirring is continued until said wax has been broken down into fine particles.

5. The process of claim 1 wherein, after said further stirring, said suspension is cooled to room temperature.

6. The process of claim 5 wherein said suspension is cooled with stirring.

7. The process of claim 5 wherein said wax is filtered out of the cooled suspension.

8. The process of claim 1 wherein, after said further stirring, said suspension is added to cold water while stirring.

9. The process of claim 8 wherein talcum is added to said cold water.

10. The process of claim 9 wherein 0.1 to 0.5% by weight of said talcum based on the water is added to said cold water.

11. The process of claim 1 wherein, after said further stirring, said suspension is washed and dried.

12. The process of claim 11 wherein said suspension is washed with water containing talcum.

13. The process of claim 1 wherein said further stirring takes place for about 10 minutes to 3 hours.

14. The process of claim 1 wherein said suspension is stirred for about 1 hour at a lower temperature and then stirred for about an additional 2 hours at said temperature just below the melting point range.

* * * * *